April 17, 1951  V. S. HINTLIAN  2,549,310
ROTOR AND STATIONARY-CHAMBER MACHINE FOR CRUSHING,
MIXING OR REFINING OF LIQUIDS OR SEMILIQUIDS
Filed July 3, 1948  2 Sheets—Sheet 1
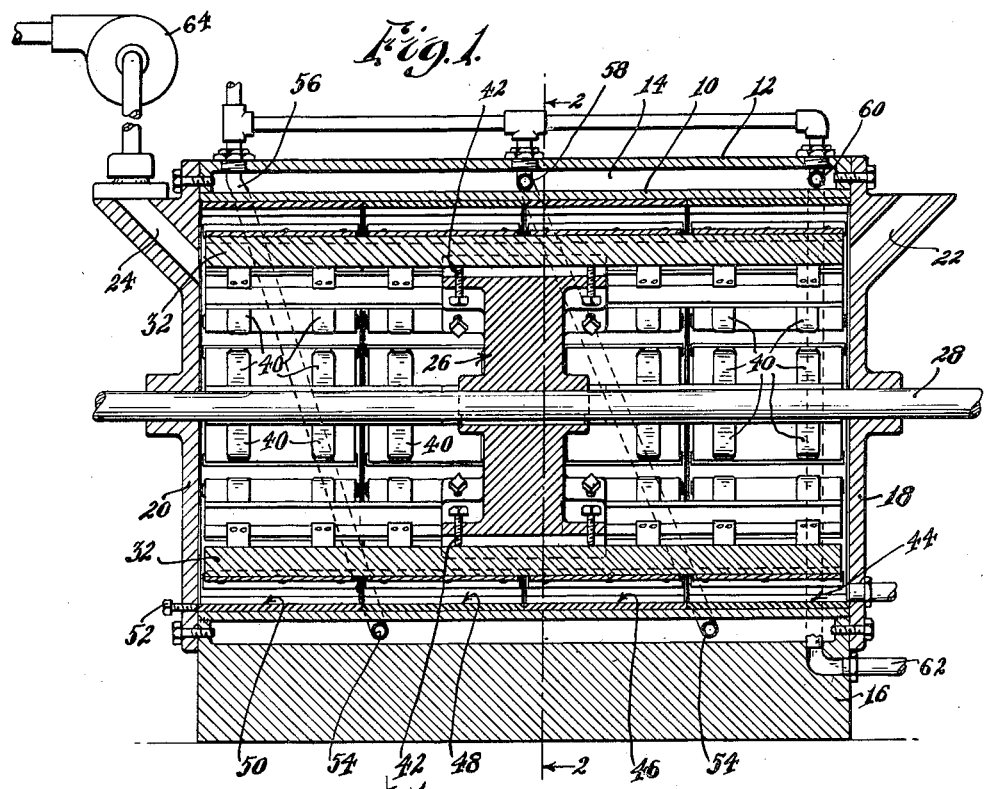
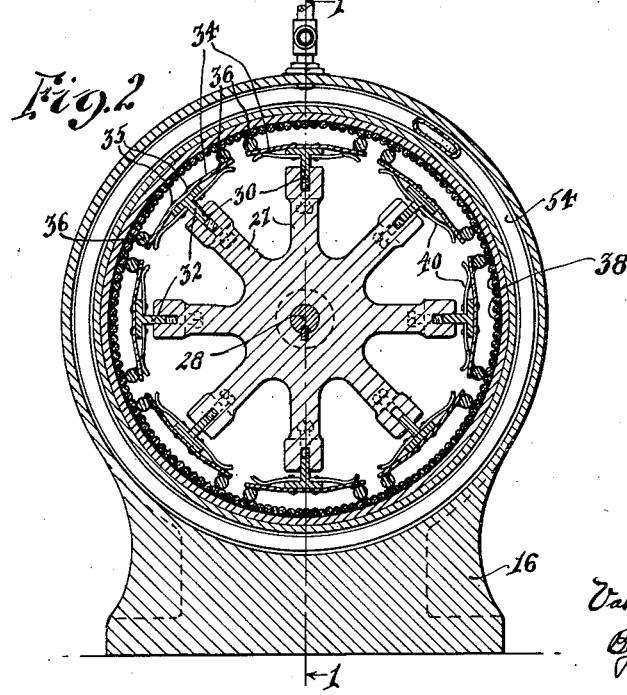
Inventor
Vahan S. Hintlian
By his Atty.
John H. McKenna

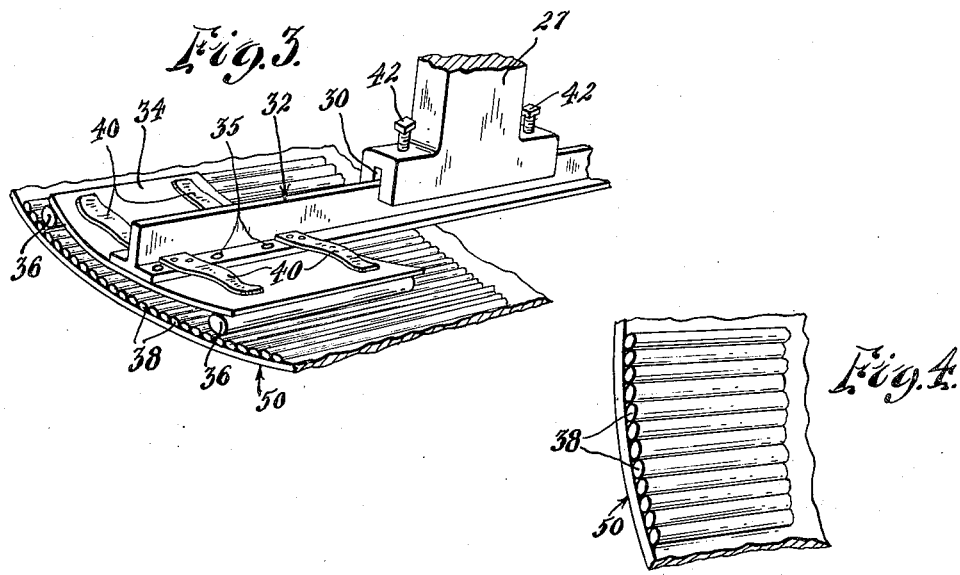
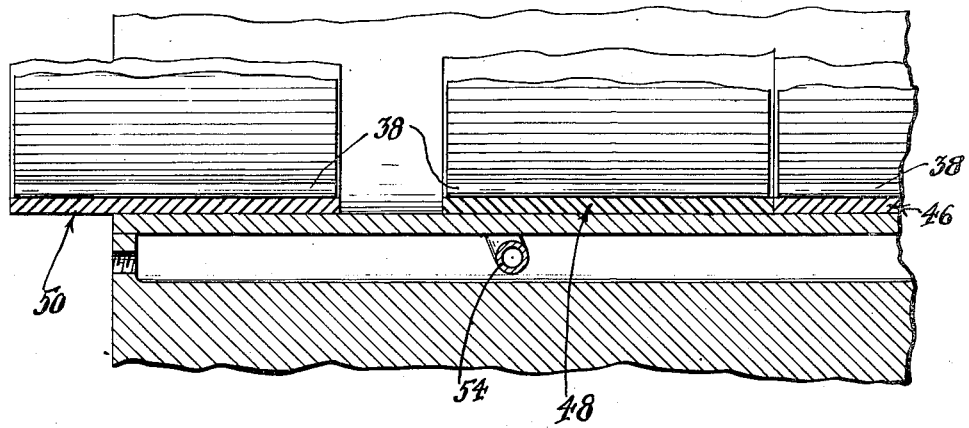

Patented Apr. 17, 1951

2,549,310

UNITED STATES PATENT OFFICE 2,549,310

ROTOR AND STATIONARY-CHAMBER MACHINE FOR CRUSHING, MIXING, OR REFINING OF LIQUIDS OR SEMILIQUIDS

Vahan S. Hintlian, Watertown, Mass., assignor to Deran Confectionery Co., Inc., Cambridge, Mass., a corporation of Massachusetts Application July 3, 1948, Serial No. 36,964

5 Claims. (Cl. 241—102)

This invention relates to improvements in apparatus for processing various liquid and semiliquid substances or mixtures where a crushing of solids and a general refining action is requisite or desirable and/or where a thorough mixing and blending of constituents of a mixture or emulsion is wanted. More particularly, the invention improves upon prior apparatus and machines suitable for processing chocolate, paint and various other materials of comparable consistency, and is herein disclosed as embodied in apparatus for refining chocolate for use in the manufacture of candy.

Chocolate customarily is processed in a drum having cylindrical side walls defining a relatively large chamber whose opposite ends are closed by removable end plates, excepting that an opening through each end wall high up on the drum permits air circulation in the drum chamber above the supply of chocolate which is being processed. The chocolate is delivered into the drum through one of the said end wall openings. A rotor is mounted within the drum chamber and is equipped with a series of radially disposed arms, each of which is adapted to carry a plurality of grinding units in side-by-side relation, for grinding coaction with a longitudinally grooved or otherwise roughened interior wall surface of the drum.

In such machines, and especially in machines for processing chocolate, it is requisite that generated frictional heat, and the effects thereof, be controlled within close limits in order to ensure against burning of the chocolate while permitting a desired caramelling of the chocolate.

It is among the objects of the present invention to provide an apparatus for processing liquid and semi-liquid substances, wherein the generation of frictional heat may be more effectively controlled as compared with prior comparable machines, and wherein the effect of generated heat also may be closely controlled. I provide a processing structure wherein each side-by-side plurality of rotary grinding units coacts with only its own drum-liner unit which is relatively easily and quickly removable and replaceable as may be desired.

Another object is to provide drum-liner units whose surface elements for coaction with the rotary units may be selected as to material for providing a desired coefficient of friction in any particular processing operation.

A further object is to provide drum-liner units each of which comprises a cylinder insertible in the drum and removable therefrom which has a multiplicity of cross-sectionally round rods covering its interior surface in side-by-side parallelism, said rods constituting fixed elements on the drum for grinding coaction with rotary grinding units.

Yet another object is to provide drum-liner units arranged in butted edge to edge relation within the drum, with exposed means for forcing or jacking the units longitudinally of the drum.

Another object is to provide an air-jacketed drum having removable annular units lining its interior and arranged in edge to edge relation for coaction, each with particular rotary grinding units, and having a conduit arranged as a helix within said air jacket for conducting a cooling or heating fluid around approximately one-half the annular extent of each liner unit.

It is, moreover, a purpose and object generally to improve the structure and operation of liquid and semi-liquid processing apparatus, and more especially such apparatus suitable for processing chocolate.

In the accompanying drawings:

Fig. 1 is a medial cross-sectional view, on line 1—1 of Fig. 2, through apparatus embodying features of the invention;

Fig. 2 is a cross-sectional view on line 2—2 of Fig. 1;

Fig. 3 is a fragmentary perspective view of one of the rotary grinding units in coacting relation to a section of one of the drum-liner units;

Fig. 4 is a perspective view of a fragment of one of the drum-liner units, on a larger scale; and Fig. 5 is an enlarged cross-sectional view showing portions of drum-liner units in positions within the drum, and showing one liner unit partially removed from the drum.

Referring to the drawings, the apparatus of the invention, in the illustrated embodiment, comprises a relatively large drum having inner and outer cylindrical side walls 10, 12 which are spaced apart to provide an air jacket 14 all around the inner cylinder walls 10, and having a base portion 16 for supporting the drum on a floor or the like with the longitudinal axis of the drum in a horizontal plane. The opposite ends of the drum or cylinder are closed by end plates 18, 20, each of which has an inclined opening therethrough at an upper region thereof, the opening in end plate 18 being indicated at 22, and that in plate 20 being indicated at 24.

A rotor 26 is mounted centrally within the inner cylinder 10, it being fixed on shaft 28 which is journalled in suitable bearings in the end plates 18, 20. The shaft may be driven at a suitably low speed in any convenient manner such as by being connected to an electric motor (not shown) with reduction gearing (not shown) to provide a desired relatively low shaft speed.

The particular rotor 26 as herein illustrated has eight radially disposed arms 27 extending outward from its hub, and each arm 27 is grooved as at 30 along its outer end, in parallelism with the axis of the drum and shaft 28. A rigid T-beam 32 is loosely engaged in the groove 30 of each arm 27 of the rotor, each beam having length only slightly less than the distance between the end plates 18, 20, so that the beams may be carried around by the rotor, with the engagement of the central portion of a beam in a groove 30 of a rotor arm serving to lock the beams and rotor against relative rotation.

In the illustrated embodiment, each beam 32 carries four grinding units which are in side-by-side relation from end to end of the beam, each comprising a relatively broad resilient sheet member 34 secured as at 35 to the outer flat surface of the beam, with equal substantial projection at opposite sides of the beam. A cross-sectionally round rod element 36 is welded or otherwise secured along each side edge of sheet member 34, in general parallelism with the axis of shaft 28, these elements 36 constituting grinding elements which constantly are resiliently pressed against coacting liner elements 38 interiorly of cylindrical wall 10. The relation of the rotor arms 27, beams 32, and the elements carried by the beams is such that the sheet members 34 are constantly tensioned so that they, in and of themselves, strongly urge the rod elements 36 against the liner elements 38. However, it is preferable to employ spring members 40 which act with and additional to the resilience of sheet members 34 to augment the pressure applied to rod elements 36, four such spring members 40 being shown for each sheet member 34, each secured at one end to a beam 32 and having its other end portion resiliently pressing a side portion of sheet member 34 in general direction toward the liner elements 38. Also, the substantial weight of each beam 32, as it moves through a substantial lower arc of its travel, tends to increase the pressure of rod elements 36 against the liner elements 38 by increasing the tension of sheet members 34.

As best seen in Figs. 1 and 3, the grooved outer end of each rotor arm 27 has extensions at opposite sides of the arm, and each extension has a set screw 42 threaded therein, with its inner end within the groove 30 in position to engage the T-beam in the groove. Hence, by adjusting the two set screws 42 on each arm 27, the permissible depth of the engagement of the T-beam in groove 30 may be adjusted, thereby to increase or decrease the tension of the resilient sheet members 34. Also, it permits any slight canting of a beam relative to the axis of shaft 18, as may be desired in some cases, in order to equalize applied pressures at the various grinding units.

It is a feature of the invention that each rotor-carried grinding unit coacts with its own separable and readily replaceable cylinder or annulus of drum-liner elements 38.

In apparatus of the general type to which the invention relates, the inner surface of the drum, or cylinder 10, has been variously treated heretofore to provide a longitudinally grooved surface for coaction with the grinding units of the rotor. However, all of the prior proposals, so far as I am aware, have treated the interior drum surface as an entirety, without giving needed consideration to the fact that it is practically impossible to have each of a side-by-side series of grinding units on a rotor operate with applied pressure equal to that of each other. The prior comparable machines have been subject to relatively rapid wear at the grooved or otherwise treated interior surface of the drum, and this wear has been unequal at different locations along the drum surface. Furthermore, they have been of a nature to generate objectionable amounts of frictional heat which, in the case of chocolate processing, sometimes results in a spoiled batch of chocolate, due to burning.

In the prior machines which have had grooves formed directly in the wall of the drum, any substantial wear at this wall has necessitated complete dismantling of the machine in order to restore the surface for a proper coaction with the rotor grinding units, thus putting the machine out of service for a considerable period.

The present invention provides a separate drum-liner unit or annulus for coaction with each side-by-side series of grinding units of the rotor, and provides a novel construction for the drum-liner units whereby selection of material having a satisfactory coefficient of friction may be made to suit any particular processing operation. And it is a feature that any one or more of the drum-liner units may be relatively easily and quickly removed when worn, and a new liner unit inserted, without dismantling the machine as a whole or putting it out of service for any great length of time.

In Fig. 1, four drum-liner units or annuluses 44, 46, 48 and 50 are shown clamped edgewise together between the casing or drum end walls 18, 20 with the clamping pressure applied through the medium of three or more set screws 52 (only one of which is visible) threaded through the end wall 20 and engaging the adjacent end of the liner unit 50. If desired, similar set screws may be provided in the opposite end wall 18. It will be apparent that the same set screws 52, when end wall 18 is removed, may be employed to force or jack the liner unit 44 out of the drum or casing enough to facilitate gripping of its projecting part for a complete removal of the unit.

As herein shown, all of the liner units 44, 46, 48 and 50 are identical and interchangeable as to their positions within the casing or drum. Hence, if any one or more units is subjected to more rapid wear than others, their relative positions may be changed from time to time, or any one or more of the units may be replaced by new ones, with no substantial interruption of service inasmuch as the liner units relatively quickly may be removed from and inserted in the drum.

Each liner unit comprises a cylinder 38' on whose inner surface a multiplicity of cross-sectionally round rods are secured in close side-by-side relation all around the annulus of the cylinder, with the rods parallel to each other and to the axis of the cylinder. Conveniently, the rods may be welded to the cylinder surface, and the material of which the rods are made may be selected so as to coact with the rod elements 36 on the rotor grinding units and generate a minimum amount of heat due to friction. This permissible selection of liner units according to the effect desired is of particular importance in chocolate processing where a rather delicate control of the heat is requisite to attain a caramelling of the chocolate without actually burning it.

According to the invention, only particular ones of the rotor grinding units coact with any one liner unit, and heat generation by friction more effectively may be controlled than with the prior comparable machines.

However, the invention further controls the heat effect by means of the helical conduit 54 within the air jacket 14. Conduit 54 is a single helical pipe extending from the inlet location at 56 at one end to the inlet location at 60 at the other end, whence the pipe extends downward in a vertical plane at the rear side of the apparatus, as shown in Fig. 1, to the outlet conduit 62. There is a third inlet to the helical pipe 54 midway between the end inlets, as at the location 58. Conduit 54 is adapted to conduct either a cooling or heating fluid on a course which follows around approximately one-half the annular extent of each liner section to effectively control the processing temperature. Ordinarily a cooling medium will be flowed through the conduit 54 during operation of the machine, and a heating fluid may be flowed through to liquefy contents of the drum following a period of idleness of the machine. I have found that the cooling and heating effects may be closely controlled and maintained with the multiple liner units and helical conduit arrangement of Fig. 1 wherein three separate inlets to the helix are provided at equally spaced upper portions 56, 58 and 60 of the helix, with a single outlet 62 at the bottom. In Fig. 1, the forward portions of the helix 54, which extend from the lower two locations 54 to the upper locations 58 and 60, respectively, are cut away, only the rear portions of the helix being shown, in dotted lines.

With the illustrated arrangement a generally uniform heating effect is attained from end to end of the drum, and caramelling of chocolate, for example, can be effectively accomplished with greatly reduced danger of burning the chocolate as compared with prior chocolate processing procedures.

The substance or substances to be processed, such as chocolate, may be delivered into the drum through the end wall opening 22.

The rotor ordinarily travels relatively slowly, with the grinding units thereon being carried around in grinding coaction with their respective liner units 44, 46, 48 and 50. Customarily the drum will be approximately three-fourths or two-thirds full of the chocolate or other substance, so that a substantial air space is provided above the chocolate through which a current of air constantly may flow to remove rancid and other objectionable odors which are peculiarly associated with the processing of chocolate. In Fig. 1, a pump or blower 64 is connected to the end wall opening 24 for drawing air from the interior of the drum, the opposite end opening 22 being open for inflow of air.

As the rotor grinding units are carried above the level of chocolate in the drum, each carries with it a substantial amount of the chocolate which, as the unit continues its upward movement, is dropped in a well known manner with a slapping action. The forced current of air above the chocolate passes through and around the lifted and dropped quantities of chocolate and more effectively aerates same with more effective elimination of objectionable odors.

I claim as my invention:

1. In an apparatus for processing liquid and semi-liquid substances, a hollow drum having generally cylindrical side walls and removable end walls, a power shaft extending longitudinally and axially through the drum and journalled in said end walls, a rotor fixed on said shaft within the drum and having a plurality of radially disposed arms terminating a substantial distance short of the inner surface of said cylindrical side walls, the end portion of each said rotor arm having a groove therein open toward said drum, a rigid beam at the end of each said rotor arm and extending longitudinally within the drum substantially from end wall to end wall thereof, each said beam having a wall extending from end to end of the beam and slidably engaged in a said groove of a rotor arm and having a laterally projecting portion extending from said wall throughout the length of the beam whereby said wall and laterally projecting portion of each beam constitute a long scoop for carrying material upward in the drum and dropping it with a slapping and mixing effect, a plurality of resilient units in side-by-side relation on each said beam, and separate annular members removably fixed within the drum in positions for processing coaction each with a different plurality of said resilient units, each said annular member having alternating longitudinal crests and grooves all around its annulus, and each said resilient unit having spaced apart longitudinally crested elements resiliently engaging, and adapted to ride over, only the said crests of the particular annular member which is positioned for processing coaction therewith.

2. In an apparatus for processing liquid and semi-liquid substances, a hollow casing having generally cylindrical side walls and removable end walls, a relatively thin cylinder having a multiplicity of cross-sectionally round rods secured to its inner surface to provide an annulus wherein the axes of the rods are parallel to each other and to the longitudinal axis of said casing, said annulus being loosely and removably arranged within said casing as a liner for said cylindrical side walls of the casing, a rotor rotatably mounted within said casing and having resilient grinding units thereon resiliently engaging said rods, holding means for effecting endwise clamping of said annulus between the casing end walls with said endwise clamping constituting the only means for holding said annulus against rotation within the casing, said holding means being releasable at an end of the casing to release said annulus for endwise removal of the annulus.

3. In an apparatus for processing liquid and semi-liquid substances, a hollow casing having generally cylindrical side walls and removable end walls, a plurality of cylinders each having a multiplicity of cross-sectionally round rods secured in parallelism to its inner surface and each cylinder, with the rods thereon, constituting an annulus for lining the cylindrical side walls of the casing, said annuluses being loosely and removably arranged in end to end relation within said casing with each annulus constituting a liner for a different portion of the axial extent of said cylindrical side walls, a member rotatably mounted within said casing and having a plurality of resilient grinding units thereon opposite each said annulus of liner rods, said grinding units resiliently engaging the liner rods, means retaining all of the annuluses at rest while one plurality of said grinding units move in grinding coaction with the liner rods of only one annulus, and another plurality of said grinding units move in grinding coaction with the liner rods of another annulus, said annuluses being readily removable through an end of said hollow casing when an end wall of the casing is removed.

4. In an apparatus for processing liquid and semi-liquid substances, a hollow casing having generally cylindrical side walls and removable end walls, a plurality of cylinders each having a multiplicity of cross-sectionally round rods secured in parallelism to its inner surface and each cylinder, with the rods thereon, constituting an annulus for lining the cylindrical side walls of the casing, said annuluses being removably arranged within said casing with each annulus constituting a liner for a different portion of the axial extent of said cylindrical side walls, means on at least one of said end walls for clamping all of said annuluses edgewise together between the two end walls, after the end walls have been secured in place, a member rotatably mounted within said casing and having a plurality of resilient grinding units thereon opposite each said annulus of liner rods, one plurality of said grinding units being arranged and adapted to resiliently engage the liner rods of one annulus when said member rotates, and another plurality of said grinding units being arranged and adapted to resiliently engage the liner rods of a different one of said annuluses when said member rotates, and a plurality of scoop elements carried by said rotatably mounted member and extending substantially from end wall to end wall of the casing for carrying material upward within the casing and dropping it with a slapping and mixing effect.

5. In an apparatus for processing liquid and semi-liquid substances, a hollow drum having generally cylindrical side walls and removable end walls, a power shaft extending longitudinally and axially through the drum and journalled in said end walls, a rotor fixed on said shaft within the drum and having a plurality of radially disposed arms terminating a substantial distance short of the inner surface of said cylindrical side walls, the end portion of each said rotor arm having a groove therein open toward said drum, a rigid beam at the end of each said rotor arm and extending longitudinally within the drum substantially from end wall to end wall thereof, each said rigid beam being substantially T-shape in cross-section and the dimensions of the stem of each T being approximately uniform throughout the length of each beam and being loosely engaged in a said groove of a rotor arm whereby the beams are carried around by the rotor and are gravity actuated radially toward said drum during their travel below the horizontal plane of the rotor axis, whereby each said beam constitutes a long scoop for carrying material upward in the drum and dropping it with a slapping and mixing effect, a plurality of resilient units in side-by-side relation on each said beam, and separate annular members removably fixed within the drum in positions for processing coaction each with a different plurality of said resilient units, each said annular member having alternating longitudinal crests and grooves all around its annulus, and each said resilient unit having spaced apart longitudinally crested elements resiliently engaging, and adapted to ride over, only the said crests of the particular annular member which is positioned for processing coaction therewith.

VAHAN S. HINTLIAN.

REFERENCES CITED

The following references are of record in the file of this patent:

UNITED STATES PATENTS

| Number | Name | Date |
|---|---|---|
| 180,149 | Moore | July 25, 1876 |
| 190,675 | Gaines | May 15, 1877 |
| 1,087,415 | Welton | Feb. 17, 1914 |
| 1,114,320 | Walker | Oct. 20, 1914 |
| 1,257,882 | Koehler | Feb. 26, 1918 |
| 1,404,851 | Hartshorn | Jan. 31, 1922 |
| 1,428,687 | Ferencz | Sept. 12, 1922 |
| 1,650,088 | Molin | Nov. 22, 1927 |
| 1,692,884 | Bramley-Moore | Nov. 27, 1928 |
| 1,692,903 | Bramley-Moore | Nov. 27, 1928 |
| 1,711,063 | Riley | Apr. 30, 1929 |
| 1,740,194 | Bramley-Moore | Dec. 17, 1929 |
| 2,092,628 | Allen | Sept. 7, 1937 |
| 2,105,766 | Francis | Jan. 18, 1938 |
| 2,295,473 | Hollstein | Sept. 8, 1942 |
| 2,483,453 | Boyle | Oct. 4, 1949 |

FOREIGN PATENTS

| Number | Country | Date |
|---|---|---|
| 16,837 of 1897 | Great Britain | May 7, 1898 |